United States Patent
Kurihara

(10) Patent No.: US 10,086,457 B2
(45) Date of Patent: Oct. 2, 2018

(54) POWER SUPPLY UNIT AND MULTI-WIRE ELECTRICAL DISCHARGE MACHINING APPARATUS

(71) Applicants: CANON MARKETING JAPAN KABUSHIKI KAISHA, Minato-ku (JP); MAKINO MILLING MACHINE CO., LTD., Meguro-ku (JP)

(72) Inventor: Haruya Kurihara, Sagamihara (JP)

(73) Assignees: Canon Marketing Japan Kabushiki Kaisha, Tokyo (JP); Makino Milling Machine Co., LTD., Tokyo (JP)

(*) Notice: Subject to any disclaimer, the term of this patent is extended or adjusted under 35 U.S.C. 154(b) by 310 days.

(21) Appl. No.: 14/698,696

(22) Filed: Apr. 28, 2015

(65) Prior Publication Data
US 2015/0314384 A1    Nov. 5, 2015

(30) Foreign Application Priority Data

Apr. 30, 2014  (JP) .................................. 2014-094051
Jan. 30, 2015  (JP) .................................. 2015-017627

(51) Int. Cl.
*B23H 7/04*       (2006.01)
*B23H 1/02*       (2006.01)
(Continued)

(52) U.S. Cl.
CPC ............ *B23H 7/107* (2013.01); *B23H 1/028* (2013.01); *B23H 7/04* (2013.01); *B23H 11/006* (2013.01)

(58) Field of Classification Search
CPC ...... B23K 9/067; B23K 9/073; B23K 9/0732; B23K 9/186; B23K 9/188; B23K 9/0061
(Continued)

(56) References Cited

U.S. PATENT DOCUMENTS 4,584,451 A * 4/1986 Inoue ....................... B23H 1/00
                                                           204/206
5,319,175 A * 6/1994 Truty ...................... B23H 7/107
                                                           219/137.61
(Continued)

FOREIGN PATENT DOCUMENTS

CN        103028797 A      4/2013
CN        103228387 A      7/2013
(Continued)

OTHER PUBLICATIONS

"Notification of Reasons for Refusal"; Application number: Patent Application No. 2015-017627.
(Continued)

*Primary Examiner* — Ibrahime A Abraham
*Assistant Examiner* — Biniam Asmelash
(74) *Attorney, Agent, or Firm* — Canon U.S.A., Inc. IP Division

(57) ABSTRACT

Provided is a power supply unit, which is to be used for a multi-wire electrical discharge machining apparatus arranged to slice a material to be machined by an electrical discharge generated between a wire group including a plurality of turns of a wire arranged in parallel and the material to be machined, and to which a power supply terminal to be brought into contact with the wire group at a time to supply a voltage to the wire group is mounted, the power supply unit including: a mounting portion to which the power supply terminal to be brought into contact with the wire group at a time is mounted; and an adjusting portion arranged to adjust an inclination of the mounting portion in a direction crossing a running direction of the wire group.

13 Claims, 11 Drawing Sheets

(51) Int. Cl.
*B23H 7/10* (2006.01)
*B23H 11/00* (2006.01)

(58) Field of Classification Search
USPC ... 219/69.12, 69.13, 69.15, 69.17, 68, 69 W, 219/69 M, 69 C, 69 P, 69 R, 137.61
See application file for complete search history.

(56) References Cited

U.S. PATENT DOCUMENTS

| | | | |
|---|---|---|---|
| 9,089,916 B2* | 7/2015 | Itokazu | B23H 1/028 |
| 2010/0187203 A1* | 7/2010 | Bamberg | B23H 9/00 |
| | | | 219/69.12 |
| 2013/0240486 A1* | 9/2013 | Yamada | B23H 7/104 |
| | | | 219/69.12 |
| 2013/0240487 A1 | 9/2013 | Miyake et al. | |

FOREIGN PATENT DOCUMENTS

| | | |
|---|---|---|
| JP | 02-139025 U1 | 11/1990 |
| JP | 04-105821 A | 4/1992 |
| JP | H04135121 A | 5/1992 |
| JP | 08-019920 A | 1/1996 |
| JP | 2013-180370 A | 9/2013 |

OTHER PUBLICATIONS

Official Letter of CN 201510214275.X, English translation, pp. 1-16, Nov. 30, 2016.

* cited by examiner

AXIAL DIRECTION OF POWER SUPPLY TERMINAL

POWER SUPPLY UNIT AND MULTI-WIRE ELECTRICAL DISCHARGE MACHINING APPARATUS

BACKGROUND OF THE INVENTION

Field of the Invention

The present invention relates to a power supply unit and a multi-wire electrical discharge machining apparatus, and more particularly, to a technology of reducing a variation in contact pressure between a power supply terminal, which is brought into contact with a wire group including a plurality of turns of a wire arranged in parallel at a time, and the wire group.

Description of the Related Art

In recent years, there has been developed a method of simultaneously cutting a material to be machined such as a semiconductor material, a solar cell material, and a hard material into a plurality of pieces by electrical discharge machining within a short period of time.

For example, in order to cut the material to be machined into thin plate-like pieces, a wire electrical discharge machining apparatus controls a wire to run while applying a voltage to the wire through a power supply terminal and brings the material to be machined closer to the wire to cause an electrical discharge phenomenon. In this manner, electrical discharge machining is performed on the material to be machined.

In Japanese Patent Application Laid-Open No. 08-19920, there is a description that a power supply terminal having a cylindrical shape or a columnar shape is used and an outer circumferential surface thereof is used as a contact position with a wire electrode.

Further, in Japanese Patent Application Laid-Open No. 04-105821, there is disclosed a power supply terminal made of a material having a small electrical resistance such as copper or brass, which includes a plating layer made of a hard material formed on a surface of the material having a small electrical resistance.

The wire electrical discharge machining apparatus respectively disclosed in Japanese Patent Application Laid-Open Nos. 08-19920 and 04-105821 are both single-wire electrical discharge machining apparatus.

On the other hand, in a multi-wire electrical discharge machining apparatus using a power supply terminal that is brought into contact with a wire group including a plurality of turns of a wire arranged in parallel at a time to supply a voltage to the wire group, a contact pressure between the power supply terminal and the wire is varied unless the power supply terminal and the wire group are arranged in parallel to each other and are brought into contact with each other in the parallel state. In this case, there is a fear in that power cannot be stably supplied to the wire.

Further, if the power supply terminal is pressed hard against the wire so as to stably supply the power to the wire, the degree of wear of the power supply terminal or the degree of damage of the wire disadvantageously increases. Thus, it becomes difficult to perform stable electrical discharge machining for a long period of time.

SUMMARY OF THE INVENTION

In view of this, the present invention provides a system for reducing a variation in contact pressure between a power supply terminal, which is brought into contact with a wire group including a plurality of turns of a wire arranged in parallel at a time, and the wire group.

According to one embodiment of the present invention, there is provided a power supply unit, which is to be used for a multi-wire electrical discharge machining apparatus arranged to slice a material to be machined by an electrical discharge generated between a wire group including a plurality of turns of a wire arranged in parallel and the material to be machined, and to which a power supply terminal to be brought into contact with the wire group at a time to supply a voltage to the wire group is mounted, including: a mounting portion to which the power supply terminal to be brought into contact with the wire group at a time is mounted; and an adjusting portion arranged to adjust an inclination of the mounting portion in a direction crossing a running direction of the wire group.

Further features of the present invention will become apparent from the following description of exemplary embodiments with reference to the attached drawings.

DESCRIPTION OF THE EMBODIMENTS

Now, an embodiment of the present invention is described in detail referring to the accompanying drawings.

Figure 1:
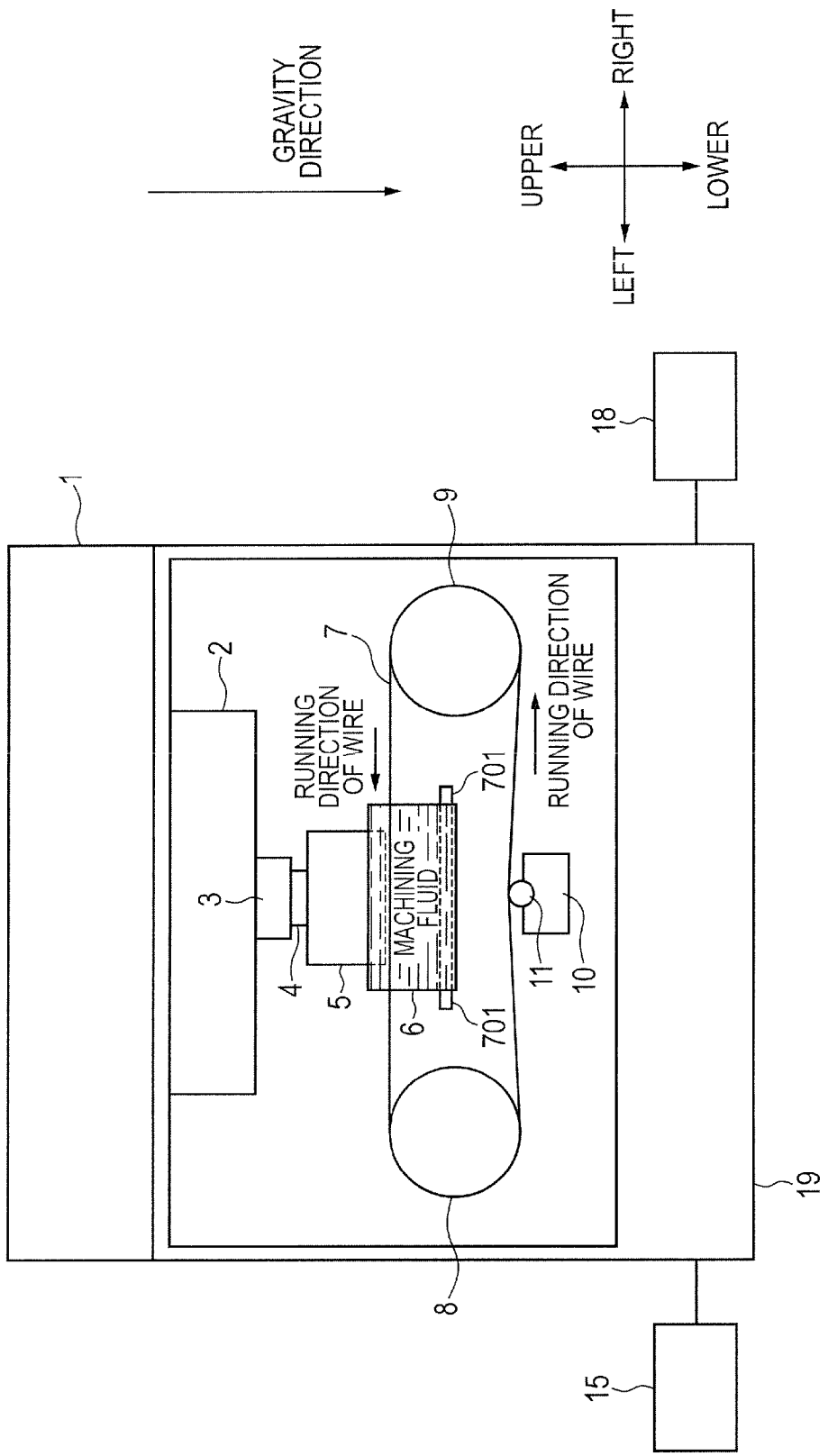
FIG. 1 is an external view of a multi-wire electrical discharge machining system as viewed from a front side.

FIG. 1 is an external view (front view) of a multi-wire electrical discharge machining apparatus 1 according to this embodiment as viewed from a front side. A configuration of each of mechanisms (units) illustrated in FIG. 1 is merely an example. It is apparent that there are various configuration examples in accordance with purposes and applications. Further, an upward direction and a downward direction herein respectively correspond to those in a gravity direction, whereas a right direction and a left direction herein respectively correspond to those in a case where the multi-wire electrical discharge machining apparatus is viewed from the front side.

A multi-wire electrical discharge machining system according to this embodiment includes the multi-wire electrical discharge machining apparatus 1, a power source unit (power source apparatus) 15, and a machining fluid supply apparatus 18.

The multi-wire electrical discharge machining system can slice a material 5 to be machined (such as a silicon ingot) at intervals between a plurality of rows of a wire, which are arranged in parallel, into thin pieces by electrical discharge.

The multi-wire electrical discharge machining apparatus 1 is connected to the power source unit 15 through an electric wire (voltage application wire) and is actuated by power supplied from the power source unit 15.

Through vertical movement of a feeding apparatus 3 for the material to be machined driven by a servomotor (not shown), the multi-wire electrical discharge machining apparatus 1 can move the material 5 to be machined, which is bonded onto the feeding apparatus 3 for the material to be machined by a bonding portion 4 (electrically-conductive adhesive, for example), in the vertical direction.

The multi-wire electrical discharge machining apparatus 1 is an example of application of the multi-wire electrical discharge machining apparatus according to this embodiment, and slices and machines the material 5 to be machined by an electrical discharge generated between a wire group 7 and the material 5 to be machined.

In this embodiment, the movement of the material to be machined in the downward direction brings the material 5 to be machined closer to the wire group 7. Then, the electrical discharge is generated between the material 5 to be machined and the wire group 7 to perform electrical discharge machining on the material 5 to be machined. At this time, a gap between the material 5 to be machined and the wire group 7 is filled with a machining fluid. The machining fluid has an electrical resistance value within a predetermined range, and hence the electrical discharge is generated between the material 5 to be machined and the wire group 7. In this manner, the electrical discharge machining can be performed on the material 5 to be machined.

Alternatively, the electrical discharge machining can also be performed between the material 5 to be machined and the wire group 7 in the following manner. Specifically, the feeding apparatus 3 for the material to be machined is located lower than the wire group 7. The material 5 to be machined is moved in the upward direction. Then, the material 5 to be machined is brought closer to the wire group 7.

In this embodiment, although the silicon ingot is described as an example of the material 5 to be machined, other materials (conductors or semiconductors) such as silicon carbide (SiC), which are not insulating materials, can also be used.

As illustrated in FIG. 1, the multi-wire electrical discharge machining apparatus 1 includes a block functioning as a base for the multi-wire electrical discharge machining apparatus 1 and a block 2 installed in an upper part of the block 19. The multi-wire electrical discharge machining apparatus 1 further includes the feeding apparatus 3 for the material to be machined, the bonding portion 4, the material 5 to be machined, a machining fluid tank 6 having a machining fluid supply port 701, a main roller 8, the wire group 7, a main roller 9, a power supply unit 10, and a power supply terminal 11.

The power source unit (power source apparatus) 15 supplies power to the multi-wire electrical discharge machining apparatus 1.

The feeding apparatus 3 for the material to be machined positions the material 5 to be machined and promotes the electrical discharge machining. Further, in order to efficiently generate the electrical discharge in accordance with a state of the electrical discharge, the feeding apparatus 3 for the material to be machined is controlled by an electrical discharge servo control circuit for controlling the servomotor so that a discharge gap between the material 5 to be machined and the wire group 7 is kept constant.

The feeding apparatus 3 for the material to be machined is an apparatus including a mechanism for moving the material 5 to be machined, which is bonded (joined) by the bonding portion 4, in the vertical direction. Through the movement of the feeding apparatus 3 for the material to be machined in the downward direction, the material 5 to be machined can be brought closer to the wire group 7.

The machining fluid supply apparatus 18 supplies the machining fluid, which is required to cool an electrical discharge machining portion in which the electrical discharge is generated between the wire group 7 and the material 5 to be machined and remove machining chips (debris), to the machining fluid tank 6 through the machining fluid supply port 701 by a pump. Further, the machining fluid supply apparatus 18 removes the machining chips in the machining fluid, controls and adjusts a specific resistance or a conductivity (1 μS/cm to 250 μS/cm) by an ion-exchange resin, and controls and adjusts a fluid temperature (in the vicinity of 20° C.). Although water is mainly used as the machining fluid, an electrical discharge machining oil can also be used. Although water is used as an example of the machining fluid in this embodiment, the electrical discharge machining oil may be used instead.

Each of the main rollers 8 and 9 has a predefined number of guide grooves at predefined pitches so that the material 5 to be machined can be machined with a desired thickness. A single wire 801 with a controlled tensile force, which is supplied from a wire supply bobbin (not shown), is looped around the two main rollers 8 and 9 to form a plurality of turns (required turns) therearound, and are then fed to a winding bobbin. A running speed of the wire group 7 including the turns of the single wire 801, which are arranged in parallel, can be set to about 100 m/min to 900 m/min.

Through rotation of the main roller 9, the wire group 7 looped around the main roller 9 is allowed to run.

Through the rotation of the two main rollers 8 and 9 in the same direction at the same speed in conjunction with each other, the single wire 801 fed from the wire feeding portion (wire supply bobbin) (not shown) is looped around outer circumferences of the two main rollers 8 and 9. As a result, the wire group 7 including the plurality of turns of the wire 801, which are arranged in parallel between the main rollers 8 and 9, is enabled to run in the same direction.

The wire group 7 includes the single continuous wire 801. The wire 801 is fed from the wire supply bobbin (not shown). After looped around the outer circumferential surfaces of the main rollers 8 and 9 in a spiral manner to make a plurality of turns (about 2,000 turns at maximum) while being fitted into the guide grooves (not shown) formed on the outer circumferential surfaces of the main rollers 8 and 9, the wire 801 is wound by the winding bobbin (not shown).

The machining fluid tank 6 supplies, as the machining fluid, water controlled and adjusted to have a specific resistance (electrical conductivity) within a predetermined range to a position (discharge point) in the discharge gap, at which the wire group 7 including the plurality of turns of the wire 801 arranged in parallel (the wire 801 is also referred to as "wire electrode") and the material 5 to be machined are brought close to each other.

The machining fluid tank 6 stores the machining fluid used for the electrical discharge to be generated between the material 5 to be machined and the wire group 7 and is installed so that the machining fluid in the machining fluid tank 6 is located between the material 5 to be machined and the wire group 7.

The machining fluid is supplied to the machining fluid tank 6 through the machining fluid supply port 701 (also referred to as "machining fluid supply portion") formed in a lower part of the machining fluid tank 6.

The power supply unit 10 applies a voltage from the power source unit 15 through the electric wire to the power supply terminal 11. The power supply unit 10 is a power supply apparatus on which the power supply terminal 11 to be applied with the voltage is mounted and fixed.

Specifically, the power supply unit 10 is a power supply unit according to this embodiment, on which the power supply terminal 11 that is brought into contact with the wire group 7 including the plurality of turns of the wire 801 arranged in parallel at a time to supply the voltage to the wire group 7 is mounted.

The power supply unit 10 includes an axial-direction adjustment mechanism (adjusting portion) for mounting the power supply terminal 11 having a columnar or cylindrical shape (shape with a hollow) and adjusting an inclination of an axis of the power supply terminal 11 (having the columnar or cylindrical shape) so as to be parallel to a direction perpendicular to the running direction of the wire group 7 (width direction in which the plurality of turns of the wire included in the wire group 7 are arranged). The power supply unit 10 further includes a mechanism (moving portion) for translating the power supply terminal 11 (having the columnar or cylindrical shape) closer to or away from the wire group 7 so as to press the power supply terminal 11 perpendicularly to the running direction of the wire group 7.

Any one of a surface alone of the power supply terminal 11 or the entity of the power supply terminal 11 including interior thereof can be made using cemented carbide that is resistant to mechanical wear and has conductivity.

The material 5 to be machined is arranged above a central position between the main rollers 8 and 9. The material 5 to be machined is mounted to the feeding apparatus 3 for the material to be machined. Through the vertical movement of the feeding apparatus 3 for the material to be machined, the material 5 to be machined is moved in the vertical direction to enable the material 5 to be machined.

In the central position between the main rollers 8 and 9, the machining fluid tank 6 is installed. The wire group 7 and the material 5 to be machined are immersed into the machining fluid in the machining fluid tank 6 so as to cool the electrical discharge machining portion and remove the machining chips.

Further, the wire 801 is an electric conductor. Through the contact between the power supply terminal 11 of the power supply unit 10 supplied with the voltage from the power source unit 15 and the wire group 7, the supplied voltage is applied from the power supply terminal 11 to the wire group 7. Specifically, the power supply unit 10 applies the voltage to the wire group 7 through the power supply terminal 11.

Then, the electrical discharge is generated between each of the plurality of turns of the wire 801 included in the wire group 7 and the material 5 to be machined. As a result, the material 5 to be machined can be machined (by the electrical discharge machining) to form thin plate-like machined products (silicon wafers, for example).

Figure 2A:
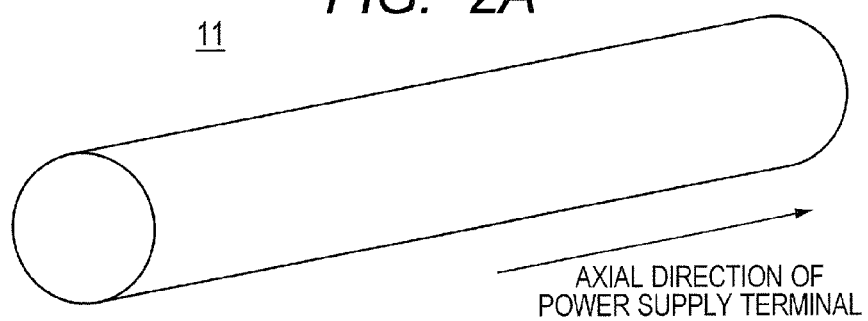
FIGS. 2A, 2B and 2C illustrate an outer shape of a power supply terminal illustrated in FIG. 1.
Figure 2B:
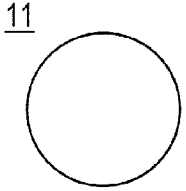
Figure 2C:
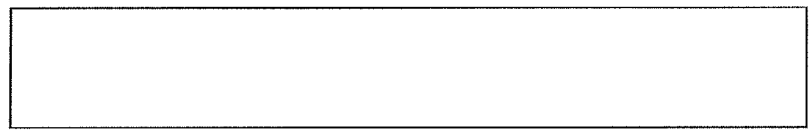

Next, FIGS. 2A to 2C are referred to. FIGS. 2A to 2C illustrate an outer shape of the power supply terminal 11 illustrated in FIG. 1.

FIG. 2A is a perspective view of the power supply terminal 11, FIG. 2B is a side view of the power supply terminal 11, and FIG. 2C is a plan view of the power supply terminal 11. As illustrated in FIGS. 2A to 2C, the power supply terminal 11 has a columnar shape.

As described above, by forming the power supply terminal 11 to have a columnar shape, the power can be supplied to the wire group 7 collectively (at a time) by using the power supply terminal 11. In addition, damage to the wire group 7, which is caused by the contact between the power supply terminal 11 and the wire group 7, can be reduced. Further, the entire outer circumferential surface of the power supply terminal 11 having the columnar shape can be used as a portion that is brought into contact with the wire group 7. Therefore, a frequency of replacement of the power supply terminal 11 can be reduced and the power supply terminal 11 can be used for a longer period of time.

Figure 3:
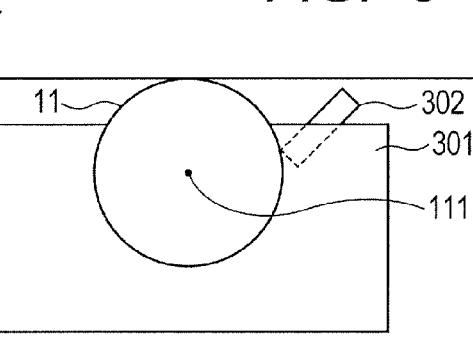
FIG. 3 is a side view of a power supply terminal fixing block included in a power supply unit having the power supply terminal mounted thereon illustrated in FIG. 1.
Figure 3:
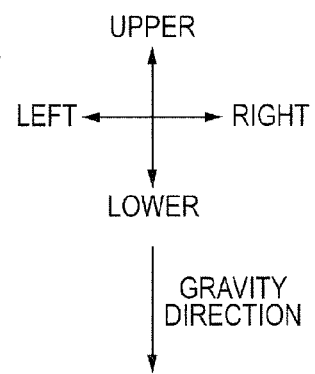

Next, FIG. 3 is referred to.

FIG. 3 is a side view illustrating a power supply terminal fixing block 301 included in the power supply unit having the power supply terminal 11 mounted thereon illustrated in FIG. 1.

Specifically, FIG. 3 illustrates the power supply terminal fixing block 301 included in the power supply unit 10 having the power supply terminal 11 mounted thereon when the multi-wire electrical discharge machining apparatus 1 is viewed from the front side.

As illustrated in FIG. 3, the plurality of turns of the wire 801 included in the wire group 7 are held in contact with an outer circumferential surface of the power supply terminal 11 having the columnar shape.

The power supply terminal fixing block 301 is an example of application of a mounting portion according to this embodiment. To the power supply terminal fixing block 301, the power supply terminal 11 having the outer circumferential portion that is brought into contact with the wire group 7 at a time is mounted.

Further, the power supply terminal fixing block 301 is a block for fixing the power supply terminal 11 and has a recess with a shape conforming to the circular sectional shape of the power supply terminal 11 having the columnar shape so that the power supply terminal 11 can be mounted therein.

The recess (a part of the mounting portion, into which the power supply terminal is mounted) has such a shape that a center point of the circular cross section of the power supply terminal having the columnar or cylindrical shape is positioned inside the mounting portion and at least half of the outer circumference surface of the power supply terminal having the columnar or cylindrical shape is held in contact with the recess.

As illustrated in FIG. 3, a cut (recess) is formed on the power supply terminal fixing block 301 so that a center point 111 of the circular cross section of the power supply terminal 11 is positioned inside the power supply terminal fixing block 301. By sliding the power supply terminal 11 in the axial direction of the columnar shape of the power supply terminal 11, the power supply terminal 11 can be mounted to the power supply terminal fixing block 301.

By simply sliding the power supply terminal 11 in the axial direction of the columnar shape of the power supply terminal 11 so that the power supply terminal 11 is mounted to the power supply terminal fixing block 301, it is conceivable that the power supply terminal 11 undesirably rotates as a result of the contact with the running wire group 7. In order to prevent the rotation of the power supply terminal 11, fixing screws 302 for fixing the power supply terminal 11 are provided.

The fixing screws 302 are inserted through screw holes formed in the power supply terminal fixing block 301 so as to be brought into contact with the power supply terminal 11, thereby fixing the power supply terminal 11.

The fixing screws 302 are an example of application of a first fixing member according to this embodiment and are members for pressing the power supply terminal 11 in a direction toward the mounting portion to fix the power supply terminal 11.

Next, referring to FIGS. 4, 5, 6, and 7, the power supply unit 10 having the power supply terminal 11 mounted thereon illustrated in FIG. 1, and a power supply terminal fixing block supporting portion 402 are described.

Figure 4:
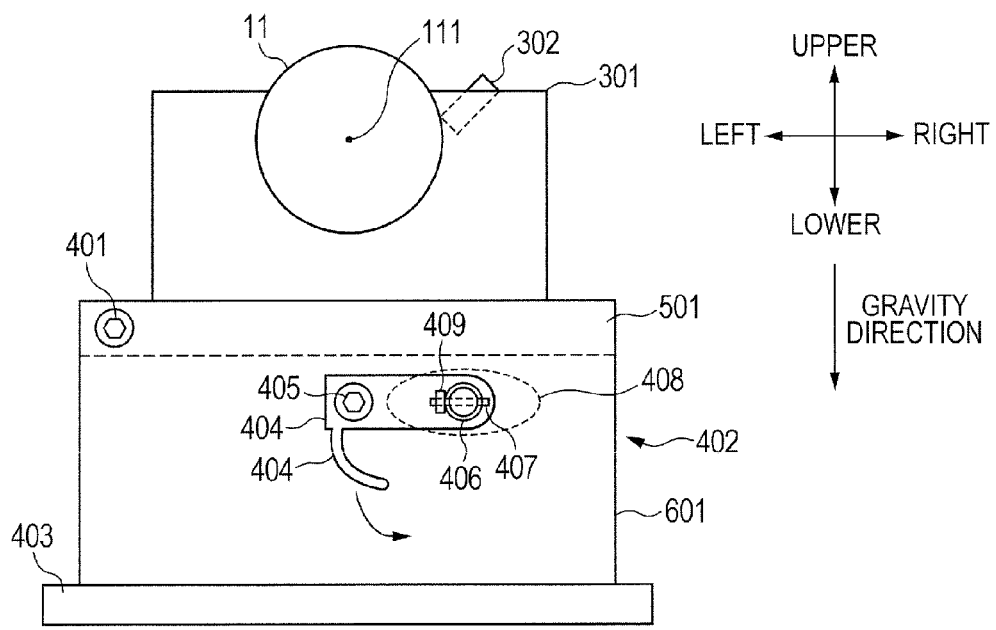
FIG. 4 is a side view of the power supply terminal fixing block included in the power supply unit having the power supply terminal mounted thereon illustrated in FIG. 1, and a power supply terminal fixing block supporting portion.

FIG. 4 is a side view of the power supply terminal fixing block 301 included in the power supply unit having the power supply terminal 11 mounted thereon illustrated in FIG. 1, and the power supply terminal fixing block supporting portion 402.

Figure 5:
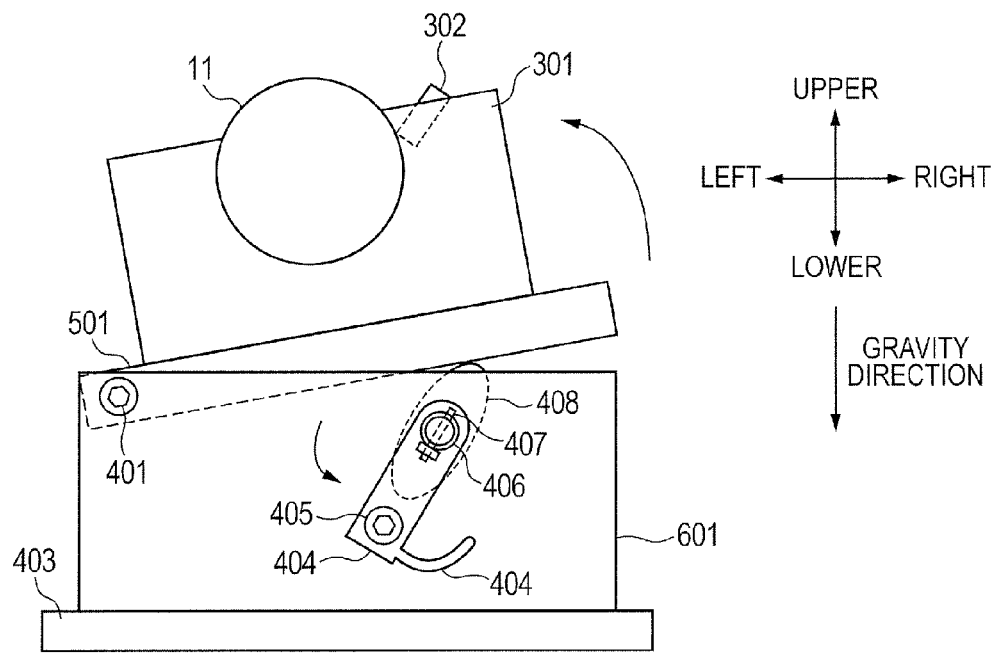
FIG. 5 is a side view of the power supply terminal fixing block included in the power supply unit having the power supply terminal mounted thereon illustrated in FIG. 1, and the power supply terminal fixing block supporting portion, illustrating a state in which the power supply terminal fixing block supporting portion moves the power supply terminal fixing block upward while maintaining parallelism between the power supply terminal and a wire group.

FIG. 5 is a side view of the power supply terminal fixing block 301 included in the power supply unit having the power supply terminal 11 mounted thereon illustrated in FIG. 1, and the power supply terminal fixing block supporting portion 402, illustrating a state in which the power supply terminal fixing block supporting portion 402 moves the power supply terminal fixing block 301 upward while maintaining the parallelism between the power supply terminal 11 and the wire group 7.

Figure 6:
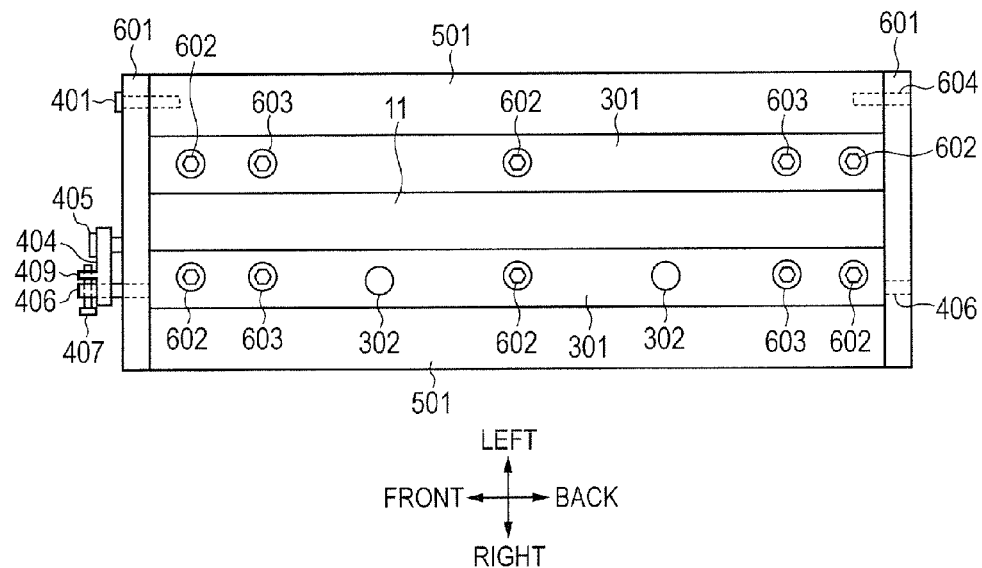
FIG. 6 is a view illustrating the power supply unit having the power supply terminal mounted thereon as viewed from an upper side.
Figure 7:
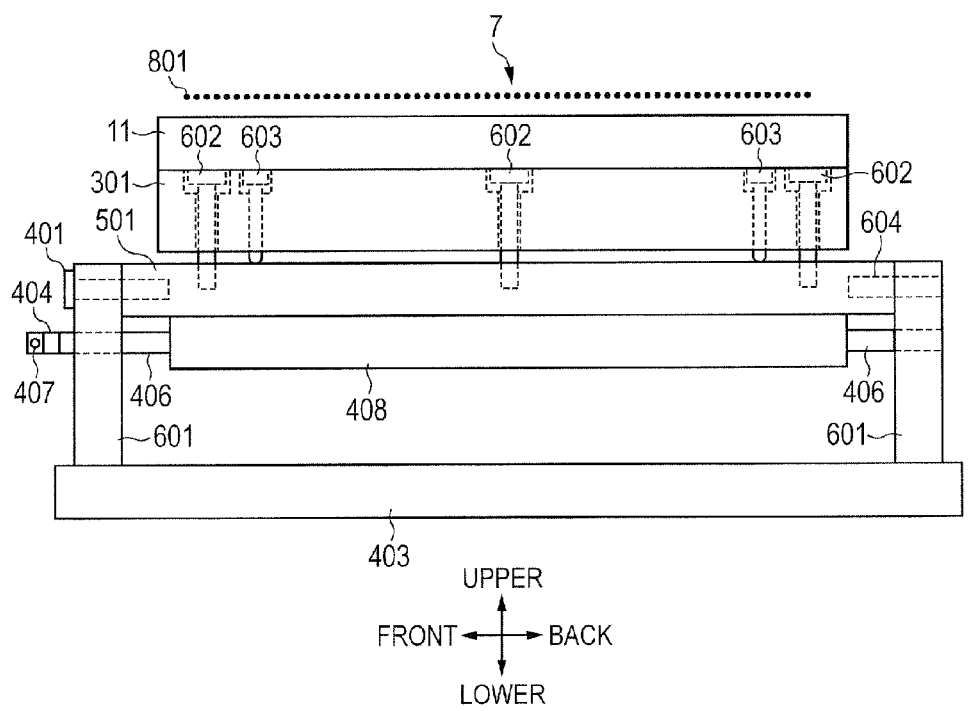
FIG. 7 is a view illustrating the power supply unit having the power supply terminal mounted thereon as viewed from a right side in FIG. 1.

FIG. 6 is a view illustrating the power supply unit 10 having the power supply terminal 11 mounted thereon as viewed from an upper side. FIG. 7 is a view illustrating the power supply unit 10 having the power supply terminal 11 mounted thereon as viewed from the right side in FIG. 1.

As illustrated in FIG. 4, the power supply unit 10 includes the power supply terminal fixing block 301 and the power supply terminal fixing block supporting portion 402.

As illustrated in FIGS. 4 and 6, the power supply terminal fixing block 301 includes the fixing screws 302 for fixing the power supply terminal 11, height adjusting screws 603, fastening screws 602, and screw holes for the respective screws.

Further, as illustrated in FIGS. 4 and 6, the power supply terminal fixing block supporting portion 402 includes an insulating plate 403, plates 601, a fixing screw 405, a lever 404 including a shaft fixing portion 409, a shaft 406, a fixing screw 407, and a cam 408. As illustrated in FIGS. 4, 6, and 7, the power supply terminal fixing block supporting portion 402 further includes a plate 501 having screw holes for the fastening screws 602, a fastening screw 401, a shaft 604, and a shaft 406.

Although the power supply terminal fixing block 301 is described as an example of the mounting portion according to this embodiment, a combination of the power supply terminal fixing block 301 and the power supply terminal fixing block supporting portion 402 may be used as the mounting portion according to this embodiment.

The power supply terminal fixing block supporting portion 402 includes the insulating plate 403 so as to prevent the voltage supplied from the power source unit 15 through the electric wire to the power supply terminal 11 from leaking to the block 19 that is the base for the power supply unit 10. The insulating plate 403 is a plate including a member made of an insulator.

Further, as illustrated in FIG. 6, the power supply terminal fixing block 301 and the power supply terminal fixing block supporting portion 402 are fastened by the fastening screws 602.

In this embodiment, an example of the power supply unit 10 in which the power supply terminal fixing block 301 and the power supply terminal fixing block supporting portion 402 are formed as independent bodies and fastened by screws or the like is described. However, the power supply terminal fixing block 301 and the power supply terminal fixing block supporting portion 402 may be integrated to be used as the power supply unit 10.

The fixing screw 401 becomes a supporting portion (rotation shaft) for fastening the plates 601 and 501 to each other and rotationally moving the plate 501 upward or downward in the gravity direction.

Further, the lever 404 is fastened to the shaft 406 that is fastened to (coupled to) the cam 408 having an ellipsoidal shape as viewed from the front side by the fixing screw 407. Each of the shaft fixing portion 409 included in the lever 404 (the shaft fixing portion 409 is formed integrally with the lever 404) and the shaft 406 has a screw hole for the fixing screw 407. By the fixing screw 407, the shaft 406 and the lever 404 are fastened.

Further, the fixing screw 405 is provided so as to maintain a state after the plate 501 is moved by the rotation about the fixing screw 401 as an axis. By fastening the fixing screw 405, the lever 404 is fixed.

The fixing screw 405 is an example of application of the fixing portion according to this embodiment and fixes the mounting portion moved by the moving portion to the position after the movement.

The shaft 406 is mounted in holes (holes through which the shaft 406 passes) of the plates 601 mounted on the front side and the back side. The shaft 406 is coupled to the cam 408 having the ellipsoidal shape on the cross section.

Therefore, when the lever 404 is rotated to the left about the shaft 406 as an axis as illustrated in FIG. 5, the cam 408 comes into contact with the plate 501 to enable the plate 501 to rotate to the left about a straight line from the fixing screw 401 to the shaft 604 as an axis. As a result, the power supply terminal 11 can be moved upward in the gravity direction.

When the cam 408 is rotated about the shaft 406 as a center, the fixing screw 405 also rotates to the left, as illustrated in FIG. 5. For the movement of the fixing screw 405, an arc-like groove (not shown) is formed in the plate 601 on the front side.

The lever 404, the shaft 406, the cam 408, the plate 501, and the fixing screw 407 are an example of application of the moving portion according to this embodiment.

As described above, the moving portion according to this embodiment moves the mounting portion to a position at which the power supply terminal 11 mounted to the mounting portion is brought into contact with the wire group 7 (moves the mounting portion in a direction toward the wire group 7) in a state in which the inclination of the mounting portion adjusted by an adjusting portion described below is maintained.

The plate 501 is fastened to the power supply terminal fixing block 301 by the fastening screws 602.

The plate 501 is an example of application of the supporting portion according to this embodiment, and the fastening screws 602 are an example of application of a fastening portion according to this embodiment.

The fastening screws 602 (fastening portion) fasten the power supply terminal fixing block 301 (mounting portion) and the plate 501 (supporting portion) for supporting the power supply terminal fixing block 301 to each other by tightening.

Although the fastening screws 602 do not fully fix the power supply terminal fixing block 301 and the plate 501 to each other, the fastening screws 602 have looseness while maintaining the fastening between the power supply terminal fixing block 301 and the plate 501. Therefore, depending on the degree of pressing the height adjustment screws 603 against the plate 501, a distance between the power supply terminal fixing block 301 and the plate 501 can be increased or reduced.

The fastening screw(s) 602 can fasten the power supply terminal fixing block 301 and the plate 501 to each other at least at one position. Further, when the fastening screws 602 fasten the power supply terminal fixing block 301 and the plate 501 at a plurality of positions, one of the fastening screws 602 can be mounted at at least one position that is away from another of the fastening screws 602 in a direction crossing the running direction of the wire group 7. Further, the fastening screws 602 can be mounted to any one of the power supply terminal fixing block 301 and the plate 501 as long as the power supply terminal fixing block 301 and the plate 501 can be fastened to each other.

The plates 601 are mounted respectively on the front side and the back side of the power supply terminal fixing block supporting portion 402 and are fastened to the plate 501 by the fixing screw 401 and the shaft 604.

The height adjustment screws 603 adjust a height between the plate 501 and the power supply terminal fixing block 301 so that the power supply terminal 11 becomes parallel to a direction perpendicular to the running direction of the wire group 7 (width direction in which the plurality of turns of the wire 801 included in the wire group 7 are arranged). The height adjustment screws 603 are an example of application of an adjusting portion (axial-direction adjustment mechanism) according to this embodiment.

The adjusting portion of this embodiment adjusts the inclination of the mounting portion in the direction crossing the running direction of the wire group 7. Specifically, the adjusting portion adjusts the inclination of the mounting portion with respect to the direction in which the plurality of turns of the wire 801 included in the wire group 7 are arranged in parallel.

The plurality of height adjustment screws 603 (adjusting portion) are mounted to the power supply terminal fixing block 301 (mounting portion) at positions that are away from each other in the direction crossing the running direction of the wire group 7, as illustrated in FIG. 6 and the like.

At positions on the plate 501, at which the height adjustment screws 603 come into contact with the plate 501 after being moved by meshing and fastening of the height adjustment screws 603 with the screw holes formed in the power supply terminal fixing block 301, screw holes for the height adjustment screws 603 are not formed. Therefore, by fastening the height adjustment screws 603, the height adjustment screws 603 press the plate 501 to increase and adjust a distance between the power supply terminal fixing block 301 and the plate 501.

Figure 8:
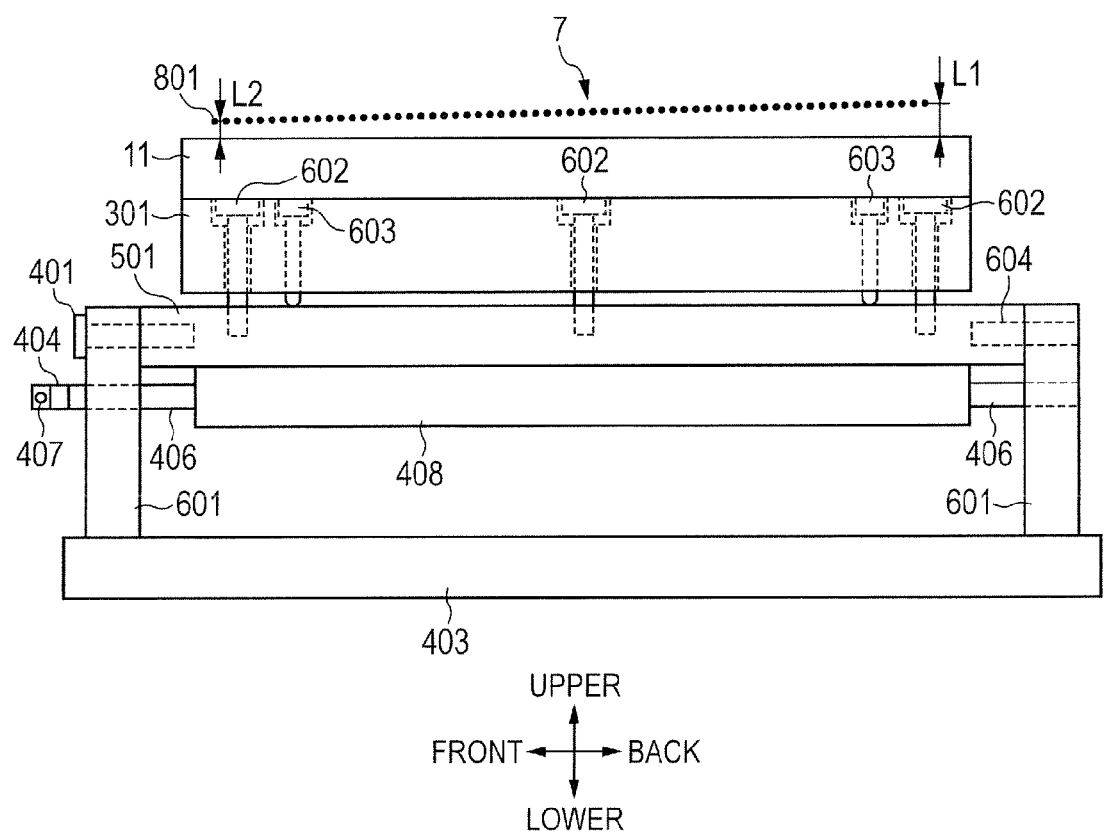
FIG. 8 is a view illustrating the power supply unit having the power supply terminal mounted thereon as viewed from the right side in FIG. 1, illustrating a state in which the wire group and the power supply terminal are not parallel to each other.
Figure 9:
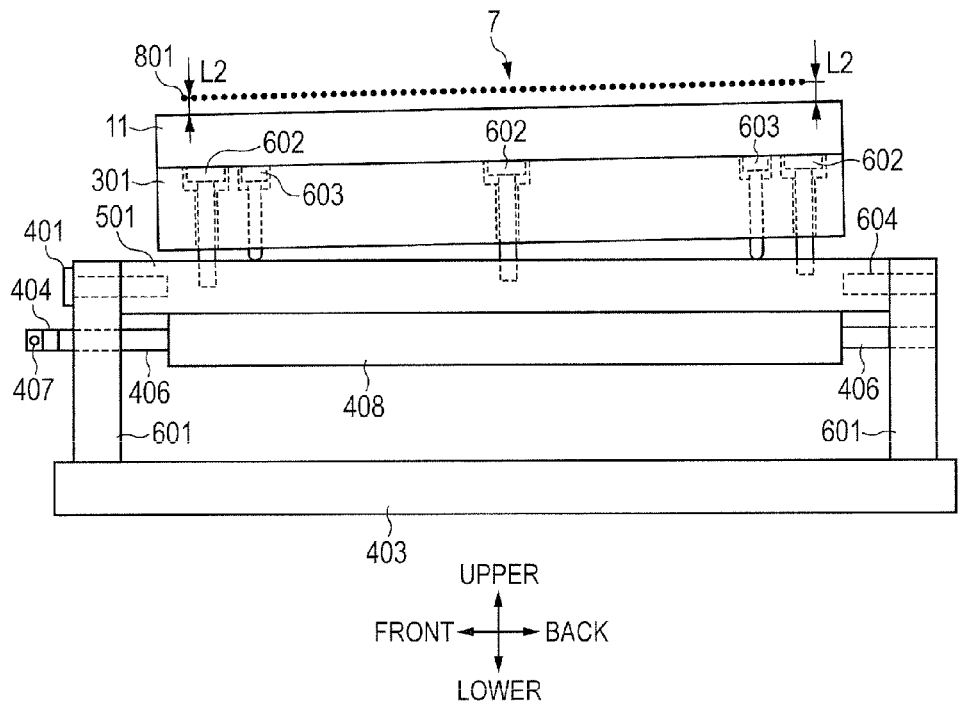
FIG. 9 is a view illustrating the power supply unit having the power supply terminal mounted thereon as viewed from the right side in FIG. 1, illustrating a state in which the wire group and the power supply terminal are made parallel to each other by fastening height adjustment screws on a back side to increase a distance between the power supply terminal fixing block and a plate on a back side.

Therefore, the height adjustment screws 603 can adjust the distance between the power supply terminal fixing block 301 and the plate 501 at positions away from the fastening screws 602 in a direction crossing the running direction of the wire group 7, as illustrated in FIGS. 8 and 9.

FIG. 8 is a view of the power supply unit 10 having the power supply terminal 11 mounted thereon as viewed from the right side in FIG. 1, illustrating a state in which the wire group 7 and the power supply terminal 11 are not parallel to each other.

In FIG. 8, a distance (L2) between the wire 801 and the power supply terminal 11 on the front side is shorter than a distance (L1) between the wire 801 and the power supply terminal 11 on the back side.

Therefore, by fastening the height adjustment screws 603 on the back side, a distance between the plate 501 and the power supply terminal fixing block 301 on the back side is increased so that the wire group 7 and the power supply terminal 11 become parallel to each other.

FIG. 9 illustrates a state in which the distance between the power supply terminal fixing block 301 and the plate 501 on the back side is increased by fastening the height adjustment screws 603 on the back side so that the wire group 7 and the power supply terminal 11 become parallel to each other.

FIG. 9 is a view illustrating the power supply unit 10 having the power supply terminal 11 mounted thereon as viewed from the right side in FIG. 1, illustrating a state in which the distance between the power supply terminal fixing block 301 and the plate 501 on the back side is increased by fastening the height adjustment screws 603 on the back side so that the wire group 7 and the power supply terminal 11 on the back side become parallel to each other. In FIG. 9, the distance between the wire 801 and the power supply terminal 11 on the front side and the distance between the wire 801 and the power supply terminal 11 on the back side are both the same distance L2.

After the wire group 7 and the power supply terminal 11 are made parallel to each other as described above, the lever 404 is rotated to the left as illustrated in FIG. 5. As a result, the power supply terminal 11 and the wire group 7 can be brought into contact with each other in a parallel manner.

Next, modified examples of the power supply terminal 11 are described.

Figure 10A:
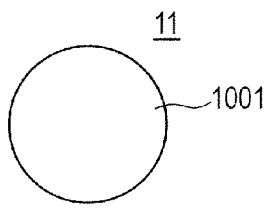
FIGS. 10A, 10B and 10C are side views illustrating the power supply unit according to a plurality of modes.

The power supply terminal 11 has been described above on the premise that the power supply terminal 11 is made of cemented carbide 1001, as illustrated in FIG. 10A. However, interior of the power supply terminal 11 may be formed as a member made of copper 1002 or stainless steel, as illustrated in FIG. 10B.

Figure 10B:
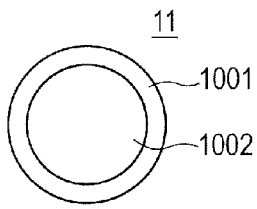
Figure 10C:
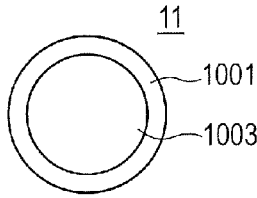

Further, as illustrated in FIG. 10C, the interior of the power supply terminal 11 may be formed as a void (a hollow 1003).

FIGS. 10A to 10C are side views of the power supply terminal 11 according to a plurality of modes.

Figure 11A:
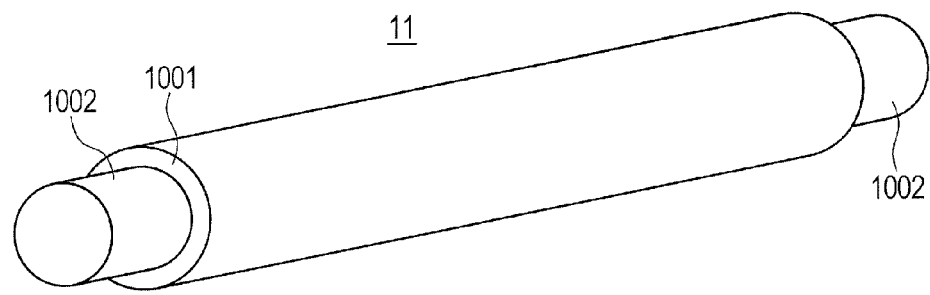
FIG. 11A is a perspective view of the power supply terminal including an inner member made of copper or stainless steel and an outer circumferential portion made of cemented carbide.
Figure 11B:
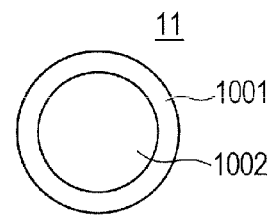
FIG. 11B is a side view thereof.
Figure 11C:
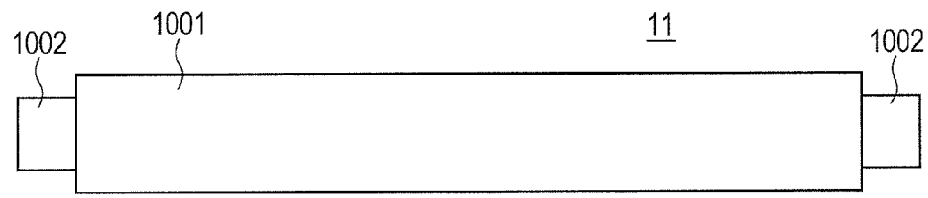
FIG. 11C is a plan view thereof.

FIGS. 11A to 11C are a perspective view (FIG. 11A), a side view (FIG. 11B), and a plan view (FIG. 11C) of the power supply terminal 11 including the inner member made of the copper 1002 or stainless steel and an outer circumferential portion made of the cemented carbide 1001 as illustrated in FIG. 10B.

As illustrated in FIGS. 11A to 11C, the inside of the cemented carbide 1001 is filled with the copper 1002. The copper 1002 is provided so as to have a longer length than an axial length of the cemented carbide 1001 of the power supply terminal 11.

As described above, the power supply terminal 11 includes the inner member made of the copper 1002 or stainless steel that is less expensive and has a lower electric resistance than that of the cemented carbide 1001 and the outer circumferential portion made of the cemented carbide 1001. In this manner, the power supply terminal 11 can be manufactured at low costs.

The power supply terminal 11 illustrated in FIGS. 11A to 11C is a power supply terminal having a columnar shape. As illustrated in FIGS. 11A to 11C, the power supply terminal having the columnar shape includes the inner member (member made of the copper 1002 or stainless steel) having a lower electric resistance than that of the outer circumferential member (cemented carbide 1001) of the power supply terminal. The inner member having a lower resistance is also formed at both axial ends of the power supply terminal having the columnar shape.

The member having a low electric resistance described in this embodiment is made of a material containing copper or stainless steel.

Figure 12A:
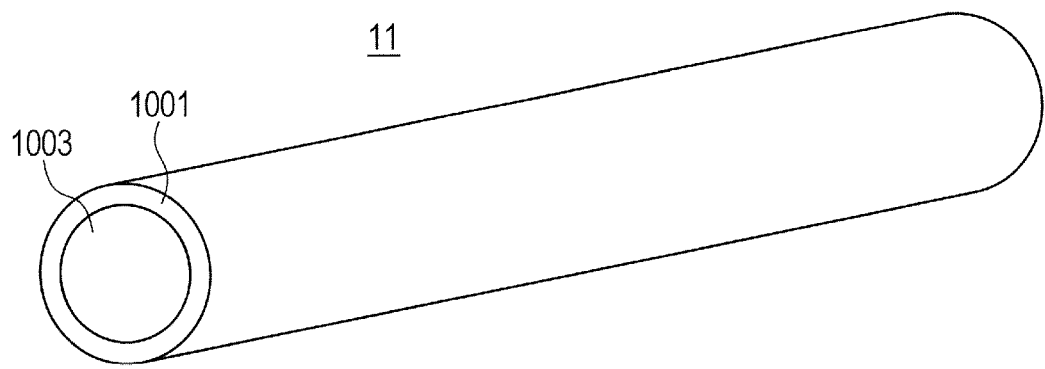
FIG. 12A is a perspective view of the power supply terminal having an interior formed as a void (hollow) and an outer circumferential portion made of the cemented carbide.
Figure 12B:
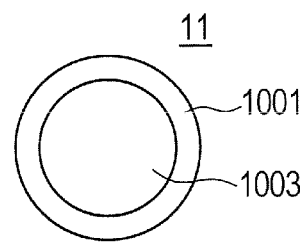
FIG. 12B is a side view thereof.
Figure 12C:
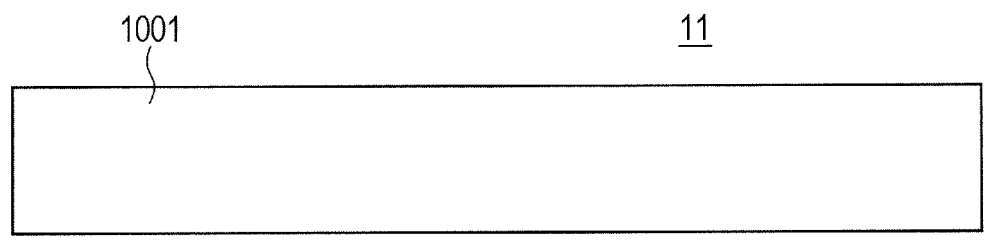
FIG. 12C is a plan view thereof.

Next, FIGS. 12A to 12C are a perspective view (FIG. 12A), a side view (FIG. 12B), and a plan view (FIG. 12C) of the power supply terminal 11 having the interior formed as a void (the hollow 1003) and the outer circumferential portion made of the cemented carbide 1001, as illustrated in FIG. 10C. The power supply terminal illustrated in FIGS. 12A to 12C is a power supply terminal having a cylindrical shape.

Figure 13A:
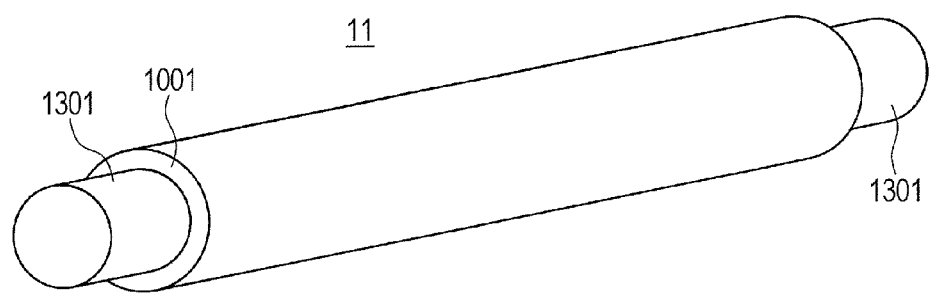
FIGS. 13A, 13B and 13C are views illustrating the power supply terminal having a shaft inserted through the hollow thereof.
Figure 13B:
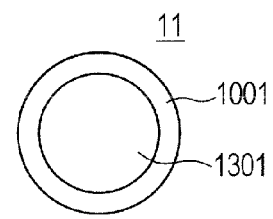
Figure 13C:
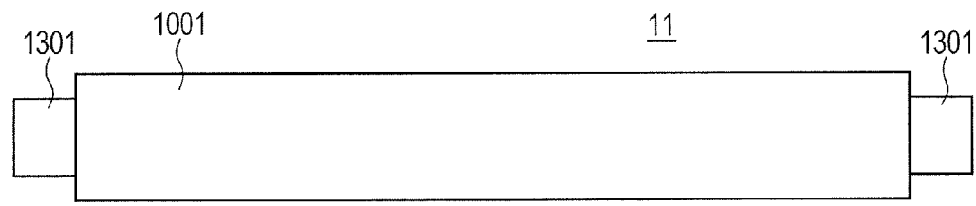

When the power supply terminal 11 having the hollow 1003 as described above is used, a shaft 1301, which is a member made of the copper 1002 or stainless steel that is less expensive and has a lower electric resistance than that of the cemented carbide 1001, is inserted into an internal space of the power supply terminal having the cylindrical shape, as illustrated in FIGS. 13A to 13C. In this manner, the central member (shaft 1301) included in the power supply terminal 11 can be reused. FIGS. 13A to 13C are a perspective view (FIG. 13A), a side view (FIG. 13B), and a plan view (FIG. 13C) of the power supply terminal 11 having the shaft 1301 inserted through the hollow 1003 thereof illustrated in FIGS. 12A to 12C.

Even in this case, as described with reference to FIGS. 11A to 11C, the shaft 1301, which has a longer length than the axial length of the cemented carbide 1001 included in the power supply terminal, is used.

Specifically, the shaft 1301 is a shaft to be inserted into the power supply terminal having a cylindrical shape and is a member (member made of the copper 1002 or stainless steel) having a lower electric resistance than that of the outer circumferential member (cemented carbide 1001) of the power supply terminal. The shaft 1301 has a longer length than the axial length of the power supply terminal 11.

Next, a method of fixing the power supply terminal 11 described above according to the modified examples illustrated in FIGS. 11A to 11C and 13A to 13C to the power supply terminal fixing block 301 is described.

Figure 14:
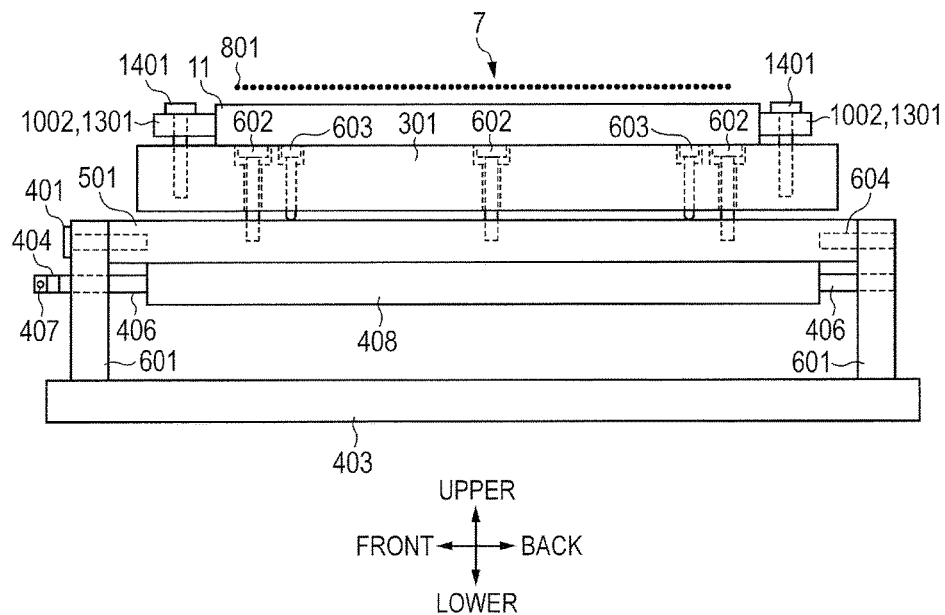
FIG. 14 is a view illustrating the power supply unit having the power supply terminal mounted thereon according to a modified example as viewed from the right side in FIG. 1.
Figure 15:
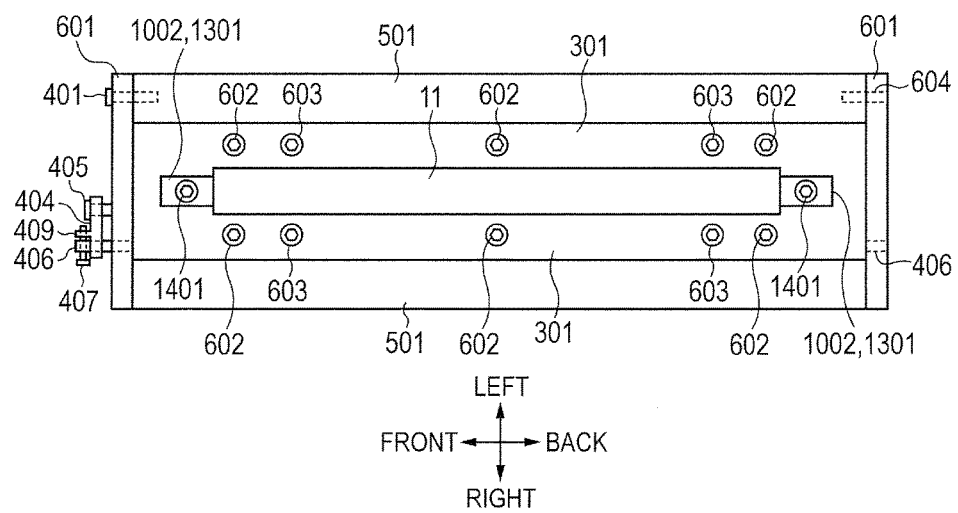
FIG. 15 is a view illustrating the power supply unit having the power supply terminal mounted thereon according to the modified example as viewed from the upper side.

When the power supply terminal 11 according to the modified examples described above is fixed to the power supply terminal fixing block 301, as illustrated in FIGS. 14 and 15, the power supply terminal fixing block 301 and the copper 1002 or the shaft 1301 are fastened by power supply terminal fixing screws 1401.

The power supply terminal fixing screws 1401 are an example of application of a second fixing member according to this embodiment. Both or any one of the ends of the low-resistance member formed at the axial ends of the power supply terminal having the columnar shape is pressed in the direction toward the mounting portion to be fixed thereto.

In addition, the power supply terminal fixing screws 1401 are an example of application of a third fixing member according to this embodiment. Both or any one of the ends of the shaft inserted into the power supply terminal having the cylindrical shape is pressed in the direction toward the mounting portion to be fixed thereto.

In this manner, the power supply terminal 11 is fixed to prevent the power supply terminal 11 from rotating due to the running of the wire 801. Further, the fixing screws 302 illustrated in FIG. 3 are not required to be used. Therefore, a fear of damaging the outer circumferential surface of the power supply terminal with the fixing screws 302 can be reduced.

Figure 16A:
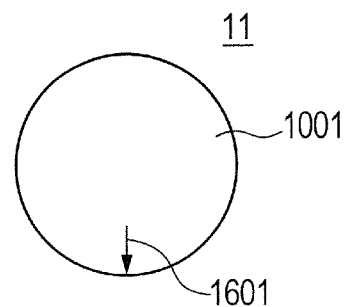
FIGS. 16A, 16B and 16C are side views respectively illustrating the power supply terminals each with a mark on a side surface thereof.
Figure 16B:
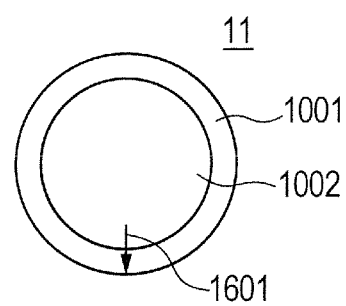
Figure 16C:
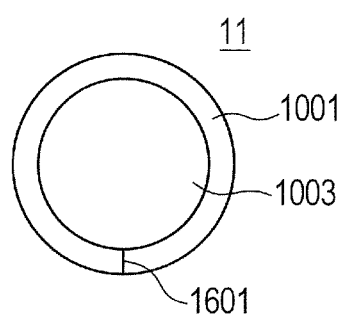

FIGS. 16A to 16C are views illustrating an example of the power supply terminal 11 having a side surface with a mark 1601. FIG. 16A is a side view of the power supply terminal 11 with the mark 1601, which is made of the cemented carbide 1001. FIG. 16B is a side view of the power supply terminal 11 with the mark 1601, including the inner member having a low resistance such as the copper 1002. FIG. 16C is a side view of the power supply terminal 11 with the mark 1601, having the interior formed as the hollow 1003.

As illustrated in FIGS. 16A to 16C, the mark 1601 is provided to the side surface of the power supply terminal 11. As a result, a distance (angle) of rotation of the power supply terminal 11 can be easily obtained.

In this embodiment, the example in which the height adjustment screws 603 are mounted to the power supply terminal fixing block 301, for example, as illustrated in FIG. 8, has been described. Instead, the height adjustment screws 603 may be mounted to the plate 501. In this case, the screw holes for the height adjustment screws 603 are formed in the plate 501, whereas the screw holes are not formed in the power supply terminal fixing block 301.

In this case, at positions on the power supply terminal fixing block 301, at which the height adjustment screws 603 come into contact with the power supply terminal fixing block 301 after being moved by meshing and fastening the height adjustment screws 603 with the screw holes formed in the plate 501, screw holes for the height adjustment screws 603 are not formed. Therefore, through the fastening of the height adjustment screws 603, the height adjustment screws 603 press the power supply terminal fixing block 301 to increase and adjust the distance between the power supply terminal fixing block 301 and the plate 501. Even in this case, the height adjustment screws 603 are mounted on the plate 501 at positions that are away from each other in the direction crossing the running direction of the wire group 7. Therefore, the height adjustment screws 603 can adjust the inclination of the mounting portion with respect to the direction in which the plurality of turns of the wire 801 included in the wire group 7 are arranged in parallel.

As described above, according to this embodiment, the power supply unit 10 to be used for the multi-wire electrical discharge machining apparatus 1 includes the mounting portion to which the power supply terminal 11, which is brought into contact with the wire group 7 including the plurality of turns of the wire 801 arranged in parallel at a time, is mounted and the adjusting portion for adjusting the inclination of the mounting portion in the direction crossing the running direction of the wire group 7. Therefore, the parallel arrangement of the power supply terminal 11 and the wire group 7 including the plurality of turns of the wire arranged in parallel can be easily adjusted. As a result, a variation in contact pressure between the power supply terminal 11, which is brought into contact with the wire group 7 including the plurality of turns of the wire 801 arranged in parallel at a time, and the wire group 7 can be reduced.

Further, a concept of the present invention is applicable to embodiments as, for example, a system, an apparatus, and a method. More specifically, the concept of the present invention may be applied to an apparatus including at least one piece of equipment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-094051, filed Apr. 30, 2014, and Japanese Patent Application No. 2015-017627, filed Jan. 30, 2015, which are hereby incorporated by reference wherein in their entirety.

What is claimed is:

1. A power supply unit, which is to be used for a multi-wire electrical discharge machining apparatus arranged to slice a material to be machined by collectively bringing a side surface of a power supply terminal having a columnar shape or a cylindrical shape into contact with a wire group in which a plurality of turns of a wire arranged in parallel with intervals to generate an electrical discharge between the wire group and the material to be machined, the power supply unit comprising:
the power supply terminal having the columnar shape or the cylindrical shape;
a power supply terminal fixing block to which the power supply terminal is mounted and fixed, the power supply terminal fixing block arranged to extend along the axis of the power supply terminal at a side of the power supply terminal;
a plate arranged to support a surface of the power supply terminal fixing block opposite from a surface of the power supply terminal fixing block on which the power supply terminal is mounted, the plate being arranged to extend along the direction in which the power supply terminal fixing block extends at a side of the power supply terminal fixing block;
a fastening portion provided between the power supply terminal fixing block and the plate so as to fasten the power supply terminal fixing block and the plate; and
an axial direction adjuster provided at a position between the power supply terminal fixing block and the plate, the position where the axial direction adjuster is provided being shifted from a position where the fastening portion is provided in the axial direction of the power supply terminal,
wherein:
the power supply terminal and the power supply terminal fixing block are provided between the wire group and the plate,
the power supply terminal is provided between the wire group and the power supply terminal fixing block; and
the axial direction adjuster moves the power supply terminal fixing block upwardly or downwardly against the plate at the position where the axial direction adjuster is provided, thereby a gap between the power supply terminal fixing block and the plate at the position where the axial direction adjuster is provided is made longer or shorter than a gap between the power supply terminal fixing block and the plate at the position where the fastening portion is provided.

2. A power supply unit according to claim 1, further comprising a moving portion arranged to move the plate in a direction toward the wire group, the direction crossing the surface of the plate on which the fastening portion is provided.

3. A power supply unit according to claim 2, further comprising a fixing portion arranged to fix the plate moved by the moving portion at a position after the movement.

4. A power supply unit according to claim 1, wherein: the power supply unit further comprises a first fixing member arranged to fix the power supply terminal to the power terminal fixing block.

5. A power supply unit according to claim 1, wherein:
the power supply terminal has a columnar shape;
the power supply terminal having the columnar shape includes an inner member having a lower electric resistance than an electric resistance of an outer circumferential member of the power supply terminal;
the inner member is further formed at both axial ends of the power supply terminal having the columnar shape; and
the power supply unit further comprises a second fixing member arranged to fix at least one of both ends of the inner member formed at both the axial ends of the power supply terminal having the columnar shape to the power supply terminal fixing block.

6. A power supply unit according to claim 1, wherein:
the power supply terminal has a cylindrical shape; and
the power supply unit further comprises:
a shaft to be inserted into an internal space of the power supply terminal having the cylindrical shape, the shaft comprising a member having a lower electrical resistance than an electrical resistance of the power supply terminal and having a length larger than an axial length of the power supply terminal; and
a third fixing member arranged to fix a part of the shaft which is inserted into the internal space to fix the power supply terminal to the power supply terminal fixing block, the part of the shaft protruding from the internal space of the power supply terminal in the axial direction of the power supply terminal.

7. A power supply unit according to claim 5, wherein the inner member having the lower electric resistance is made of a material containing one of copper and stainless steel.

8. A multi-wire electrical discharge machining apparatus, comprising the power supply unit according to claim 1, and
the wire group in which the plurality of turns of the wire arranged in parallel with intervals,
wherein a power is supplied to the wire group by collectively bring a side surface of the power supply terminal into contact with the wire group.

9. A power supply unit according to claim 1, wherein:
the axial direction adjuster comprises a height adjustment screw provided between the power supply terminal fixing block and the plate;
the power supply terminal fixing block comprises a screw hole for the height adjustment screw; and
the plate is provided without a screw hole for the height adjustment screw.

10. A power supply unit according to claim 2, wherein the moving portion comprises a cam having an ellipsoidal shape arranged to move the plate in the direction toward the wire group, the direction crossing the surface of the plate on which the fastening portion is provided.

11. A power supply unit according to claim 1, wherein the axial direction adjuster is provided at a position on the power supply terminal fixing block, which is apart from the power supply terminal when the power supply unit is viewed from the wire group.

12. A power supply unit according to claim 1, wherein the axial direction adjuster is provided at a position on the power supply terminal fixing block without overlapping to the power supply terminal when the power supply unit is viewed from the wire group.

13. A power supply unit according to claim 1, wherein the axial direction adjuster comprises:
an adjustment screw; and
a screw hole provided to any one of the power supply terminal fixing block and the plate.

* * * * *